(12) United States Patent
Mercat et al.

(10) Patent No.: US 8,677,837 B2
(45) Date of Patent: Mar. 25, 2014

(54) TORQUE-MEASURING HUB, POWER-MEASURING SYSTEM, AND CYCLE WHEEL EQUIPPED WITH SUCH A HUB OR SYSTEM

(75) Inventors: Jean-Pierre Mercat, Chavanod (FR); Christophe Neyroud, Cran-Gevrier (FR)

(73) Assignee: Mavic S.A.S., Metz-Tessy (FR)

( * ) Notice: Subject to any disclaimer, the term of this patent is extended or adjusted under 35 U.S.C. 154(b) by 226 days.

(21) Appl. No.: 13/370,882

(22) Filed: Feb. 10, 2012

(65) Prior Publication Data

US 2012/0204658 A1     Aug. 16, 2012

(30) Foreign Application Priority Data

Feb. 10, 2011  (FR) ...................................... 11 00410

(51) Int. Cl.
*G01L 1/22*     (2006.01)
*G01L 3/00*     (2006.01)

(52) U.S. Cl.
USPC ................................. 73/862.338; 73/862.325

(58) Field of Classification Search
USPC ...................................... 73/862.338, 862.325
See application file for complete search history.

(56) References Cited

U.S. PATENT DOCUMENTS

| | | | | |
|---|---|---|---|---|
| 2,320,757 A | * | 6/1943 | Sinclair et al. | 74/337 |
| 2,399,098 A | * | 4/1946 | Carnagua et al. | 192/48.91 |
| 3,223,253 A | * | 12/1965 | Garbe et al. | 414/789.7 |
| 3,422,703 A | * | 1/1969 | Richardson et al. | 475/344 |
| 3,430,522 A | * | 3/1969 | Richardson et al. | 475/343 |
| 3,465,616 A | * | 9/1969 | Schou | 477/69 |
| 3,948,080 A | * | 4/1976 | Boyd | 73/9 |
| 5,027,663 A | * | 7/1991 | Frister et al. | 73/862.331 |
| 5,237,880 A | * | 8/1993 | Dobler et al. | 73/862.325 |
| 6,217,476 B1 | * | 4/2001 | Muller et al. | 477/5 |
| 6,418,797 B1 | * | 7/2002 | Ambrosina et al. | 73/862.29 |
| 6,865,958 B2 | * | 3/2005 | Herbold | 73/862.046 |
| 2010/0093494 A1 | * | 4/2010 | Smith | 482/8 |
| 2012/0204658 A1 | * | 8/2012 | Mercat et al. | 73/862.338 |

FOREIGN PATENT DOCUMENTS

| | | |
|---|---|---|
| EP | 0 765 804 A2 | 4/1997 |
| WO | WO-2008/109914 A2 | 9/2008 |
| WO | WO-2010/132926 A1 | 11/2010 |

* cited by examiner

*Primary Examiner* — Lisa Caputo
*Assistant Examiner* — Jamel Williams
(74) *Attorney, Agent, or Firm* — Greenblum & Bernstein, P.L.C.

(57) ABSTRACT

A hub for measuring the driving power of a cycle wheel including a central shaft defining an axis of rotation of the wheel, a hub body mounted to rotate freely about the shaft, a flange mounted to rotate freely about the hub body and axially aligned with the hub body, as well as a torque sensor including a test body which supports at least one strain gauge. The torque sensor is housed in a two-part housing which includes a cutout, arranged in an outer radial surface of the hub body, and a notch, arranged in an outer radial surface of the flange.

14 Claims, 6 Drawing Sheets

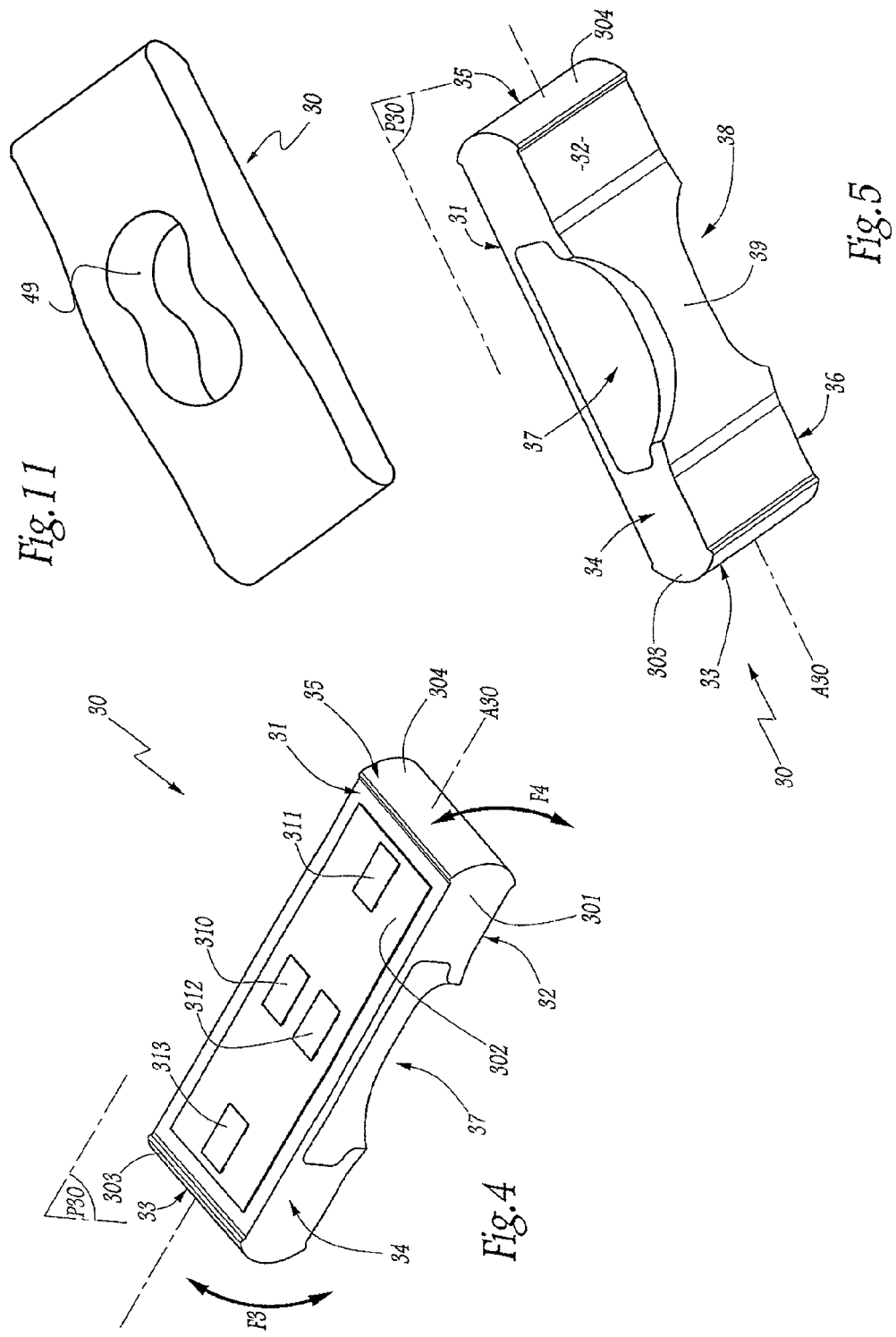

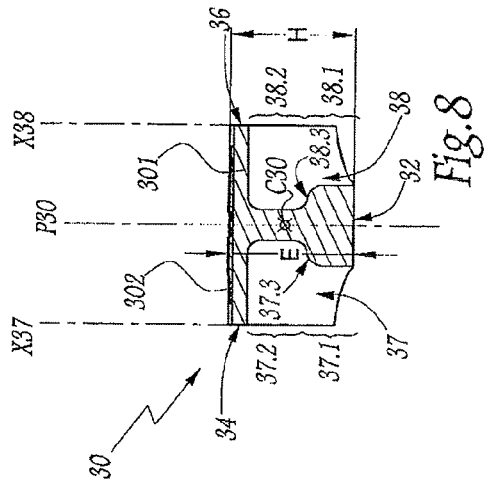
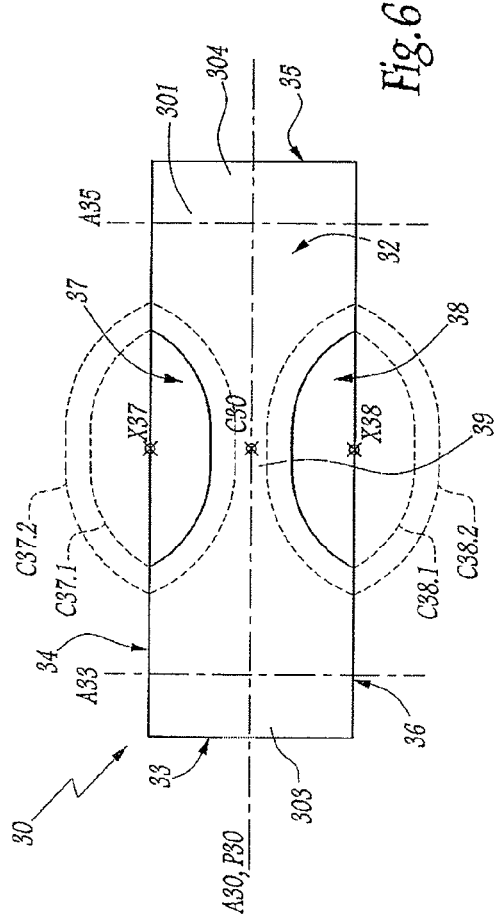
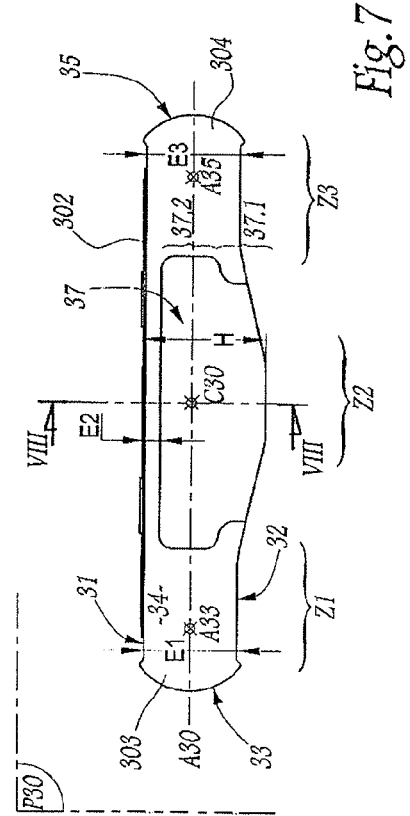

TORQUE-MEASURING HUB, POWER-MEASURING SYSTEM, AND CYCLE WHEEL EQUIPPED WITH SUCH A HUB OR SYSTEM

CROSS-REFERENCE TO RELATED APPLICATION

This application is based upon French Patent Application No. 11/00410, filed Feb. 10, 2011, the disclosure of which is hereby incorporated by reference thereto in its entirety, and the priority of which is claimed under 35 U.S.C. §119.

BACKGROUND

1. Field of the Invention

The present invention relates to a hub for measuring the torque of a cycle wheel, as well as a cycle wheel equipped with such a torque-measuring hub. The invention also relates to a hub for measuring the power of a cycle wheel, as well as a cycle wheel equipped with such a hub.

2. Background Information

Measuring the driving power of a cycle wheel is of interest in a number of cases, for example in evaluating the performance of a cyclist during training. The power generated by the cyclist can be determined by multiplying the cycle speed by the driving force transmitted by the cyclist to the drive wheel. However, measuring this force is relatively complex, and in the context of the present invention, the power is determined by multiplying the engine torque, transmitted by the cyclist to the drive wheel, by the angular velocity of the wheel.

U.S. Pat. No. 6,418,797 discloses a two-part hub for measuring the power of a cycle wheel. A driving part of the hub, rotationally movable about a fixed axis of the wheel, is rotationally driven by the cyclist who pedals, by means of a freewheel device. A driven part of the hub, within which the driving part is housed, is radially separated from the driving part by ball bearings. A connecting element, which supports strain gauges, is fixed to both the driving part and the driven part of the hub. Thus, when in use, the connecting element transmits the engine torque generated by the cyclist to the driven part, and the connecting element strains. The strain of the connecting element is measured by the strain gauge and makes it possible to obtain a measurement of the engine torque generated by the cyclist. Furthermore, a sensor measures the angular velocity of the drive wheel, which makes it possible to obtain a measurement of the power developed by the cyclist, by multiplying the engine torque by the angular velocity. Such a device is heavy and cumbersome, because it requires the presence of a relatively massive connecting element to support the strain gauges. Furthermore, the various gauges are glued to various locations of the connecting element; and they must be connected to one another by wires that are also glued to the connecting element. The fixing of separate components to the connecting element poses problems that affect manufacturing quality and reliability of the electronics.

SUMMARY

The invention overcomes the foregoing drawbacks by providing a lightweight and compact hub for measuring the power of a cycle wheel. The invention also provides a high quality hub with improved reliability at moderate cost.

To this end, the invention relates to a hub for measuring the driving torque of a cycle wheel, which includes:

a central shaft defining an axis of rotation of the wheel;
a hub body mounted to rotate freely about the shaft;
a flange mounted to rotate freely about the hub body and axially aligned with the hub body;
at least one torque sensor comprising a test body which supports at least one strain gauge, in which the torque sensor is housed in a two-part housing including a cutout, arranged in an outer radial surface of the hub body, and a notch, arranged in an outer radial surface of the flange.

According to advantageous but not essential or necessary aspects of the invention, a power-measuring hub of this type can incorporate one or more of the following characteristics, taken in any technically permissible combination:

a longitudinal axis of the sensor forms an angle less than 45°, less than 20° in a particular embodiment, with a direction orthoradial to the axis of rotation of the hub, which passes through the center of the sensor;
a longitudinal axis of the sensor forms a substantially zero angle, equal to 0° in a particular embodiment, with a direction orthoradial to the axis of rotation of the hub;
when the cyclist pedals, the sensor is compressed between a support surface of the cutout of the hub body and a support surface of the notch of the flange, opposite the support surface of the hub body;
the support surfaces are concave, and the test body includes two opposite convex support faces in contact against the concave support surfaces;
the strain gauges are attached on the same upper surface of the test body;
the test body supports four strain gauges mounted in a Wheatstone bridge configuration, and a thickness of the test body, measured perpendicular to the upper surface, varies between a minimum thickness and a maximum thickness; two of the strain gauges are located in the area of a zone of the test body, the thickness of which is less than the thickness of zones of the test body in the area of which the other two strain gauges are located;
the test body includes two notches located on both sides of a longitudinal median plane of the test body; the shape of each notch is defined by a half cylinder, the complete base of which is an oblong contour;
each notch includes a lower portion, which opens out on a surface opposite the upper surface, on the one hand, and an upper portion, located on the side of the upper surface, on the other hand; the dimensions of the upper portion are greater than the dimensions of the lower portion;
the test body includes a rib centered on a longitudinal median plane of the test body.

Two sensors of the torque, each being housed in two-part housings, are interposed between the hub body and the flange. In a particular embodiment, the sensors are housed in housings that are positioned diametrically in relation to one another.

The invention also relates to a system for measuring the driving power of a cycle wheel, including such a torque measuring hub, equipped with a member for measuring the angular velocity of the hub relative to the central shaft.

Advantageously, the power measuring hub includes an electronic device connected to the torque sensor and to the measuring member, for calculating the power of the wheel from the information transmitted by the torque sensor and the measuring member.

In addition, the invention relates to a cycle wheel including such a torque measuring hub or power measuring system.

BRIEF DESCRIPTION OF DRAWINGS

The invention will be better understood from the following description of a power measuring hub according to the invention, given only by way of example, and with reference to the annexed drawings in which:

FIG. 4 is a perspective view of a sensor that is part of the hub of FIG. 1;

FIG. 5 is a perspective view, from another angle, of the sensor of FIG. 4;

FIG. 6 is a bottom view of the sensor of FIG. 4;

FIG. 7 is a lateral view of the sensor of FIG. 4;

FIG. 8 is a cross section along the line VIII-VIII of FIG. 7;

FIG. 11 is a perspective view of an alternative sensor.

DETAILED DESCRIPTION

Figure 1:
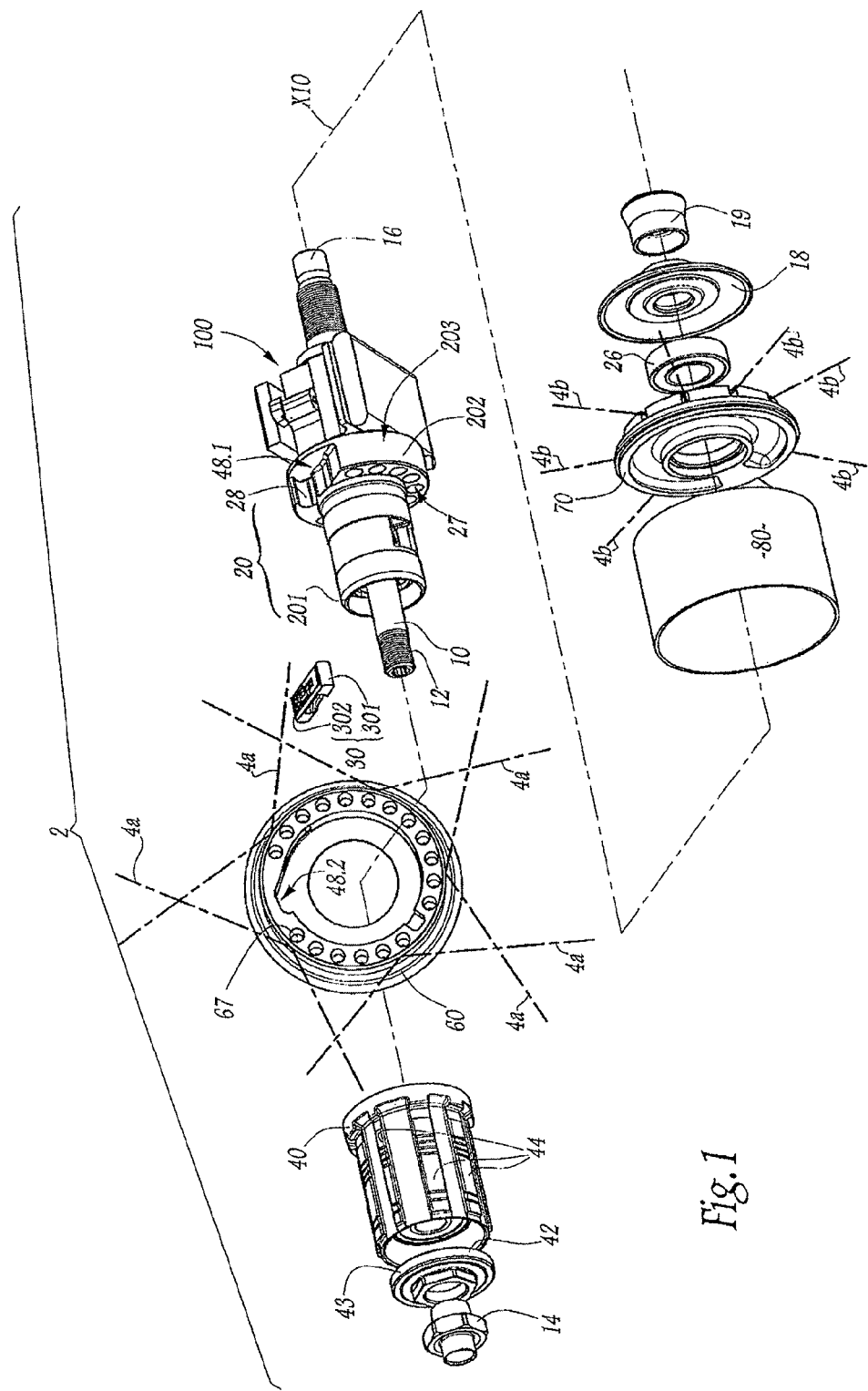
FIG. 1 is an exploded perspective view of a hub according to the invention.
Figure 2:
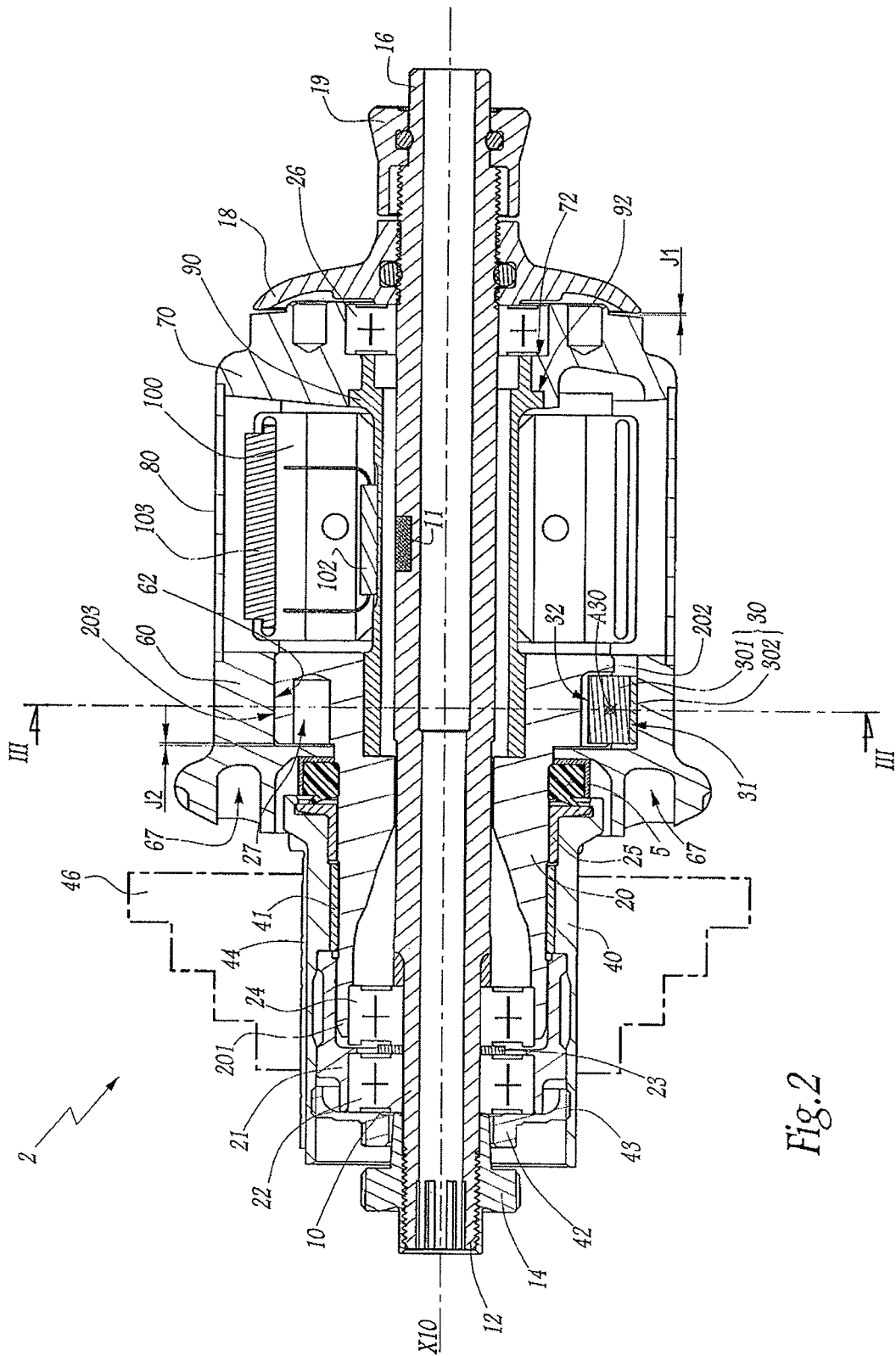
FIG. 2 is an axial cross section of the hub of FIG. 1.
Figure 3:
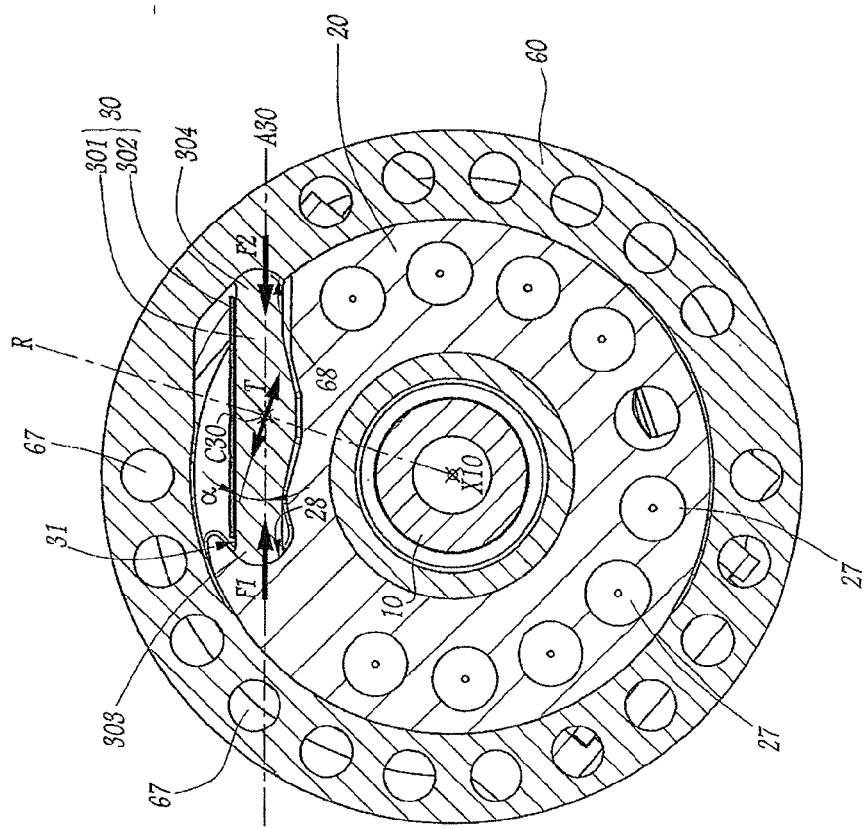
FIG. 3 is a cross section along the line of FIG. 2.
Figure 9:
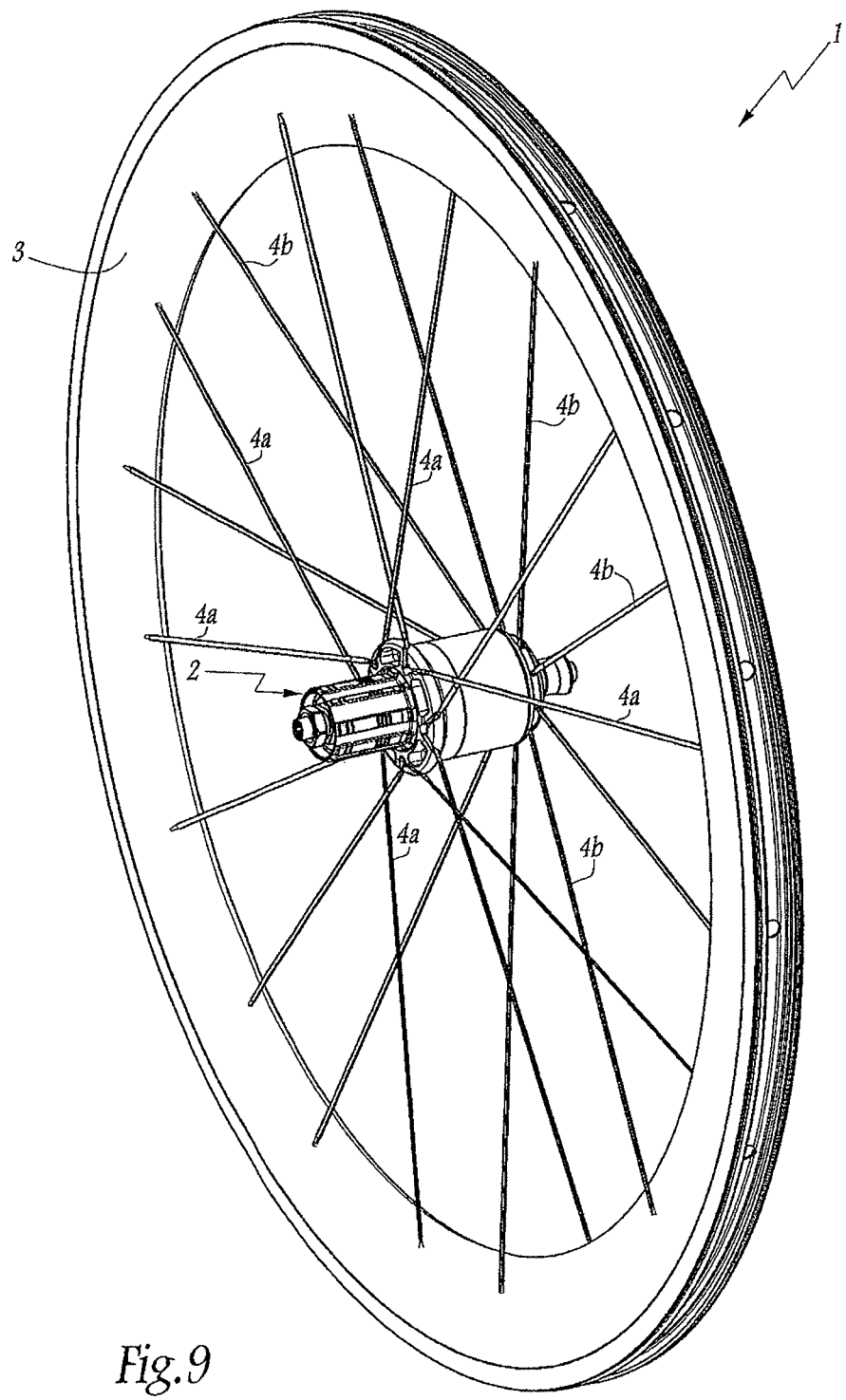
FIG. 9 is a perspective view of a cycle wheel equipped with the hub of FIG. 1.

The torque measuring hub 2 shown in FIGS. 1 to 3 is part of a bicycle rear wheel 1 shown without its tire in FIG. 9. The wheel 1 includes two spoke sets 4a and 4b mounted on a rim 3. The spoke sets 4a and 4b are represented by their center lines in FIG. 1.

The hub 2 includes a hollow shaft 10 having a longitudinal axis X10. The shaft 10 carries a nut 14 in the area of a first threaded end 12, and an end cap 19 in the area of its end 16 opposite the end 12. The nut 14 and end cap 19 enable the hub 2 and the wheel, with which it is integral, to be mounted on the frame of a bicycle.

Hereinafter, the terms "axial" and "radial", as well as their derivatives, are defined with reference to the axis X10. An axial direction is parallel to the axis X10, whereas a radial direction is perpendicular and secant to the axis X10. A radial surface is perpendicular to a radial direction, and an axial surface is perpendicular to an axial direction.

A hub body 20 is mounted about the shaft 10, with possibility of rotation with respect to the shaft 10 about the axis X10. The hub body 20 is bored with blind holes 27 in order to reduce its mass. A ball bearing 24 is radially interposed between the shaft 10 and the body 20. This bearing is arranged in the area of an axial end 201 of the hub body 20 that is turned towards the nut 14. A ring 21 is arranged around the hub body 20 and extends beyond the axial end 201, on the side of the nut 14. The ring 21 forms a housing for receiving a ball bearing 22 interposed radially between the shaft 10 and the ring 21. A washer 23 axially separates the bearing 22 and the bearing 24. A freewheel body 40 affixed to the ring 21 is mounted about the hub body 20 and the ring 21. A plain bearing 25 is radially interposed between the hub body 20 and the freewheel body 40. A shaft collar 42, provided to block the freewheel body 40 on the side of the nut 14, bears an external thread 43 which cooperates with an internal thread provided within the freewheel body 40. The nut 14 and the shaft collar 42 axially retain the bearings 22 and 24 and the ring 21.

The freewheel body 40 is provided with internal teeth 41 and the hub body 20 with two pawls, not shown, adapted to interact with the internal teeth 41 of the freewheel body 40, in order to selectively affix the bodies 20 and 40 when the hub 2 is in the so-called pedaling configuration, in which the freewheel body 40 is driving with respect to the hub body 20, because the cyclist exerts a force for rotationally driving the freewheel body 40 by means of a chain, not shown. The pawls enable a unidirectional rotation of the hub body 20 relative to the freewheel body 40 and does not oppose the rotation of the wheel when the cyclist stops pedaling.

The freewheel body 40 is provided with external ribs 44 which form reliefs for rotationally affixing the freewheel body 40 to a cogset 46 represented in FIG. 2, in dash lines, by the outline of its envelope. This cogset 46 is engaged with the chain (not shown) of the bicycle.

A flange 60 is mounted to rotate freely about an axial end 202 of the hub body 20, opposite to the axial end 201. The flange 60 is axially aligned with the axial end 202 of the hub body 20. The spoke set 4a is assembled to the flange 60 and connects the rim 3 to the flange 60. An inner radial surface 62 of the flange 60 is in contact, except for a functional clearance, with an outer radial surface 203 of the axial end 201 of the hub body 20. The flange 60 is pierced with blind holes 67 to reduce its mass. To limit friction, the flange 60 is centered on the hub body 20.

A lip seal 5 is axially interposed between the freewheel body 40 and the flange 60 to prevent dirt and debris from entering the hub 2 from the outside.

A generally parallelepipedic sensor 30, having a longitudinal axis A30, is interposed along a radial direction R between the hub body 20 and the flange 60. The sensor 30 includes a test body 301, made from a metal alloy, which demarcates a lower surface 32 turned towards the axis X10, and an upper surface 31 opposite the lower surface 32 and supporting a printed circuit board 302.

Hereinafter, and with respect to the sensor 30, the terms "length", "long", or "longitudinal" are related to the direction of the axis A30, and the terms "width", "wide", or "transverse" refer to a direction perpendicular to the axis A30 and parallel to the upper surface 31 of the test body 301.

The sensor 30 has axial ends 303 and 304, which each demarcate a respective end surface 33 and 35.

The printed circuit board 302 supports four strain gauges 310, 311, 312, and 313, visible in greater detail in FIG. 4 and oriented so as to measure a longitudinal strain of the test body 301. The gauges 310 to 313 are in the same plane, which facilitates the manufacture of the sensor 30. Advantageously, but not necessarily, gauges having a high gauge coefficient or factor are selected in order to obtain a signal of greater amplitude, and thus to improve the sensitivity of the sensor 30.

In known manner, the relative variation in the resistance of each strain gauge 310 to 313 is proportional, except for the gauge factor, to the variation in the relative length of the gauge 310 to 313 considered and, therefore, also to the variation in the relative length of the portion of the test body 301 which supports the strain gauge 310 to 313 considered.

The strain gauges 310 to 313 are conventionally mounted in full Wheatstone bridge configuration. The gauges 310 to 313 are attached on the same test body 301, which makes the signal delivered by the gauges 310 to 313 insensitive to temperature variations, as the Wheatstone bridge is thus self-compensating.

The sensor 30 is received in a two-part housing 48, the first part of which is comprised of a cutout 48.1 arranged in the outer radial surface 203 of the hub body 20, and the second part of which is comprised of a notch 48.2 provided in the inner radial surface 62 of the flange 60.

In FIG. 1, the flange 60 is positioned perpendicularly to the bodies 20 and 40, in order to show the notch 48.2. Thus, the axis X10, which is actually rectilinear, is shown as a broken line in this figure which, in the area of the flange 60, defines a right angle with the longitudinal axis of the hub body 20 and of the freewheel body 40.

When the sensor 30 is positioned in the housing 48, the end surface 33 of the sensor 30 is in support against a support surface 28 of the cutout 48.1, and the other end surface 35 of the sensor 30 is in support against a support surface 68 of the notch 48.2, which is opposite the support surface 28. A center C30 of the sensor 30 is defined midway between the end surfaces 33 and 35.

As shown in FIG. 3, the radial direction R of the hub 2 passes through the center C30 of the sensor 30. The longitudinal axis A30 of the sensor 30 is slightly inclined relative to an orthoradial direction T of the hub 2, passing through the center C30 of the sensor 30 and perpendicular to the radial direction R.

The longitudinal axis A30 forms an angle α with the orthoradial direction T. In FIG. 3, the angle α a is located in the left quadrant, in relation to the radial direction R. The angle α is approximately equal to 17°. In a preferred embodiment, the angle α is less than 45°; in another embodiment, the angle α is less than 20°.

A spacer 80 axially separates the flange 60 from a second flange 70 which carries the second spoke set 4b. The second flange 70 is not rotationally affixed directly to the flange 60. As explained more precisely hereinafter, the flanges 60 and 70 are rotationally affixed to one another through the spoke sets 4a and 4b and the rim 3. A tube 90, fitted about the shaft 10, axially separates the hub body 20 from a ball bearing 26 interposed radially between the shaft 10 and the flange 70. The flange 70 is in axial support against a shoulder 92 of the tube 90, and the ball bearing 26 is in axial support against a shoulder 72 of the flange 70. A nut 18 is axially interposed between the flange 70 and the end cap 19. There is an axial clearance J1 between the flange 70 and the nut 18. The nut 18 is screwed onto the threaded shaft 10 and is supported on the ball bearing 26 in order to adjust the axial clearance of the ball bearings 24 and 26. The flange 70 is axially blocked relative to the tube 90 but is rotationally movable relative to the flange 70. An O-ring makes it possible to create friction between the central shaft 10 and the nut 18 so that it remains properly adjusted during use.

An electronic device 100 is radially interposed between the tube 90 and the spacer 80. The electronic device 100 is equipped with a reed switch 102 for measuring the angular velocity of the hub 2. The reed switch 102 detects each revolution of the hub 2, about the shaft 10, using a magnet 11 arranged in a notch provided in the shaft 10; this makes it possible to obtain a measurement of the angular velocity of the wheel 1.

In addition, the electronic device 100 is provided with an electric energy storage battery (not shown) which powers the gauges 310 to 313. The output signal of the gauges 310 to 313 is transmitted to the electronic device 100 by a wired connection (not shown). In a non-limiting embodiment for limiting power consumption, the gauges 310 to 313 are powered in a pulsating manner by energizing them for only a few tens of microseconds, at a sampling frequency above 40 Hz.

When the cyclist pedals, in a driving movement, the pawls rotationally affix the freewheel body 40 to the hub body 20, and the hub body 20 is rotationally driven about the axis X10. Because the sensor 30 is radially interposed between the hub body 20 and the flange 60, the engine torque generated by the cyclist is transmitted to the flange 60 through the sensor 30, which is compressed in the housing 48, as indicated by the arrows F1 and F2 in FIG. 3. Thus, the test body 301 of the sensor 30 strains and varies the resistance of the strain gauges 310 to 313, which enables the electronic device 100 to calculate the value of the engine torque, on the basis of the output signals of the gauges 310 to 313. In that sense, the sensor 30 can be considered as a torque sensor.

The compression force registered by the sensor 30 is calculated from the strain of the sensor 30. The component of the compressive force useful for rotationally driving the hub 2 is along the orthoradial direction T. The engine torque is equal to the distance separating the gauges 310 to 313 from the axis X10, multiplied by this useful component. Thus, ideally, the longitudinal axis A30 is exactly aligned with the orthoradial direction T. However, in practice, the longitudinal axis A30 is slightly inclined, along the angle α, with respect to the direction T, to enable the end surfaces 33 and 35 of the sensor 30 to take support against the support surfaces 28 and 68.

The sensor 30 works mainly in compression, which makes it possible to use a compact and lightweight sensor 30 that can measure high torques. Thus, the hub 2 is relatively compact and lightweight, and effectively measures the driving torque of the wheel 1.

The electronic device 100 calculates the driving power of the wheel by multiplying the angular velocity of the hub 2 by the measurement of the engine torque provided by the gauges 310 to 313. The electronic device 100 is equipped with a transmitting antenna 103 which aerially transmits a signal related to the power measurement to an onboard computer that is fixable to the handlebar of the bicycle. For example, the signal is transmitted via a Bluetooth signal or radio waves. In a non-limiting embodiment, the spacer 80 is made of a synthetic material in order not to disturb the signal emitted by the electronic device 100.

In other words, by being equipped with the reed switch 102, the hub 2 is a system for measuring the driving power of the wheel 1.

An axial clearance J2 separates the hub body 20 and the flange 60. The spokes 4a tend to pull the flange 60 toward the other flange 70. Due to the clearance J2, the flange 70 is not in axial support against the hub body 20, which avoids generating a frictional torque that would oppose the force of the cyclist and would generate uncertainties in the torque measurement. The axial force of the flange 60 passes through the spacer 80 to reach the flange 70.

When the wheel is subject to a lateral force, for example when the cycle trajectory is curved, this force starts at the tire, passes through the rim 3 and the spoke sets 4a and 4b until reaching the flanges 60 and 70, to which the spoke sets 4a and 4b are attached. However, the flange 70 is axially blocked bilaterally, on one side by the ball bearing 26 and on the other by the shoulder 92 of the tube 90. The lack of clearance of the bilateral support is adjusted by the nut 18 as the tube 90, the flange 70 and the ball bearing 26 are stacked in series along the axis A10. Thus, it is relatively easy to cancel the axial clearance of the flange 70 during assembly of the hub 2 while keeping an angular freedom between the flange 70 and the hub body 20. This angular freedom is particularly useful during assembly of the wheel 1. Indeed, during spoking, the relative angular position of the flange 70 relative to the flange 60 is fixed via the spoke sets 4a and 4b and the rim 3. The subassembly thus comprised of the two flanges 60 and 70, the spacer 80, the spoke sets 4a and 4b, and the rim 3 is rotationally free. In addition, the sensor 30 is not subject to any prestressing force. Therefore, in the absence of torque transmitted by the chain, the sensor 30 is not biased. It is only when engine torque is transmitted that the sensor 30 is biased in compression.

Advantageously, when the wheel 1 is in freewheel mode, the offset of the sensor 30 is adjusted to zero to cancel the imbalance of the Wheatstone bridge due to the variations in the resistance of its gauges 310 to 313, and also to cancel any imbalances of the entire signal amplification and processing chain.

The electronic device 100 automatically detects the freewheel phases by analyzing the instantaneous torque variations. Indeed, during a pedaling cycle, the torque transmitted by the cyclist passes through two maximums corresponding to the positions in which the right and left cranks form an angle of 60° with the vertical, and two minimums when the cranks are in the low position. The torque measurement provided by the sensor 30 detects these modulations. When there is no modulation left, the electronic device 100 deduces that the cycle is in freewheel mode. It can then proceed to the offset.

The geometry of the sensor 30 is shown in greater detail in FIGS. 4 to 8. The sensor 30 is symmetrical with respect to a longitudinal median plane P30, which passes through the axis A30 and is perpendicular to the upper surface 31.

The test body 301 includes two small, opposite lateral surfaces, comprised of the end surfaces 33 and 35, and two large, opposite lateral surfaces 34 and 36.

As is clearly shown in FIG. 7, the lower surface 32 is not planar, and the total height of the test body 301, measured perpendicular to the upper surface 31, varies along the axis A30. The height H is minimal in two zones Z1 and Z3 located in the vicinity of the axial ends 301 and 303, respectively, and then progressively increases as it gets closer to a central zone Z2 of the test body 301, axially located between the zones Z1 and Z3.

The end surfaces 33 and 35 are convex and their transverse cross section, taken parallel to the plane P30, is constant. Thus, the surfaces 33 and 34 have the geometry of a cylinder portion. These cylinders have axes A33 and A35, respectively. The axes A33 and A35 are perpendicular to the plane P30. The center C30 is located midway between the axes A33 and A35, along the axis A30.

Two notches 37 and 38 are cut into the test body 301. The notches 37 and 38 are located on opposite sides of the plane P30 and are symmetrical, with respect to one another, relative to the plane P30. The notches 37 and 38 are separated from one another by a longitudinal central rib 39, centered on the plane P30. The rib 39 connects the upper surface 31 and the lower surface 32.

The notch 37 opens out on both the lateral surface 34 and the lower surface 32, and the notch 38 opens out on both the lateral surface 36 and the lower surface 32.

The notches 37 and 38 each include a lower portion 37.1 or 38.1, which opens out on the lower surface 32, and an upper portion 37.2 or 38.2, located on the side of the upper surface 31 and the height of which, measured perpendicular to the plane P30, is greater than that of the lower portions 37.1 and 38.1. The upper portions 37.2 and 38.2 are longer and wider than the lower portions 37.1 and 38.1, such that a shoulder 37.3 or 38.3, parallel to the upper surface 31, separates each upper portion 37.2 and 38.2 from the corresponding lower portion or 37.1 or 38.1.

The lower portion 37.1 and 38.1 of each notch 37 and 38 has the shape of a half cylinder, the base of which, considered in its entirety, is an oblong contour C37.1 or C38.1, shown in dashed lines in FIG. 6, the longitudinal axis of which is parallel to the axis A30 and coincides with the lateral surface 34 and 36, respectively. The longitudinal axes X37 and X38 of the cylinders are perpendicular to the upper surface 31.

Similarly, the upper portion 37.2 and 38.2 of each notch 37 and 38 has the shape of a half cylinder with a longitudinal axis X37 or X38, the base of which, considered in its entirety, is an oblong contour C37.2 or C38.2, shown in dashed lines in FIG. 6, the longitudinal axis of which is parallel to the axis A30 and coincides with the lateral surface 34 and 36, respectively.

The geometry of the test body 301 is specifically designed to improve the performance of the sensor 30. When the sensor 30 is compressed longitudinally, the resistance of the gauges 311 and 313, which are located in the vicinity of the axial end 303 and the axial end 304, respectively, varies very slightly, because the thickness E1 and E3 of the test body 301, in the vicinity of the lateral surfaces 33 and 35, is maximum. On the contrary, the resistance of the gauges 310 and 312, which are located above the notches 37 and 38, varies significantly, because the thickness E2 of the test body 301, in the central zone Z2, and in the area of the notches 37 and 38, is minimum. The assembly in Wheatstone bridge configuration takes advantage of these differences in resistance variation, in order to obtain a high amplitude signal at the output of the Wheatstone bridge.

Furthermore, when the sensor 30 is compressed longitudinally, a relative infinitesimal rotation of the flange 60 occurs relative to the hub body 20. Due to this rotation and the friction on the end surfaces 33 and 35 of the sensor, a bending moment is generated. The test body 301 therefore strains in bending along a direction normal to the upper surface 31, and which is in the plane P30, as indicated by the arrows F3 and F4 in FIG. 4. The bending moment crossing through the test body 301 is normal to the plane P30. The bending strain is minimized due to the geometry of the test body 301, in particular the presence of the central rib 39, which contributes to increasing the rigidity of the test body 301.

The previously described particular geometry of the test body, associated with the positioning of the four gauges 310, 311, 312, 313, makes it possible to have a signal output from the bridge that is completely independent of the bending but only dependent on the compression.

FIG. 11 shows a perspective view of a simplified variation of the sensor 30. The general outer contour is the same as the sensor described in FIGS. 4 to 8, but the notches 37, 38 are replaced by a single hole 49, the shape of which is designed so that the signal output from the bridge is independent of the bending but only dependent on the compression.

Moreover, when the sensor 30 is compressed longitudinally, the convex shape of the end surfaces 33 and 35, as well as the complementary concave shape of the support surfaces 28 and 68, prevent the surfaces 33 and 35 from hammering against the support surfaces 28 and 68.

The convex shape of the end surfaces 33 and 35 is complementary to the concave shape of the support surfaces 28 and 68. Thus, when the sensor 30 is positioned in the housing 48, the sensor 30 is rotationally movable about the axes A33 and A35, relative to the flange 60 and the hub body 20.

In another embodiment, the sensor 30 is positioned in an orthoradial housing (perpendicular to a radial direction).

In another embodiment, two sensors 30 are interposed between the hub body and the flange. These sensors are diametrically opposed relative to one another.

Figure 10:
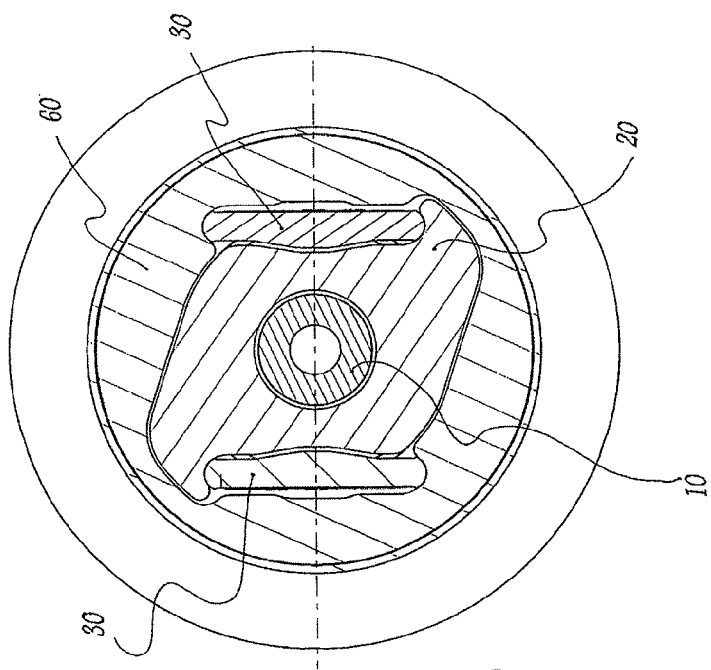
FIG. 10 is a cross-sectional view of an alternative embodiment of the invention.

FIG. 10 shows a cross-sectional view of an alternative embodiment of the invention. This is a cross-section similar to that of FIG. 3. Two diametrically opposite sensors are each positioned in a housing provided for one potion in the hub body 20, and for the other portion in the flange 60. The presence of the two sensors makes it possible to better balance the weak movement of the flange relative to the hub body. The respective shapes of the flange (inner shape) and of the hub body (outer shape) are such that the housings position the sensors along an orthoradial direction. In other words, the angle α is equal to 0° or substantially equal to this value.

In the embodiment shown in FIG. 10, one can choose to instrument both sensors, or only one sensor.

In another embodiment, not shown, the sensor 30 is positioned in a radial housing, works primarily in shear and strains primarily in bending.

In an alternative embodiment, the sensor 30 is equipped with a number of strain gauges other than four.

In another variation, the electronic device 100 is connected by a wired connection to the onboard computer, via a slip ring.

In a variation, not shown, the spacer 80 is in the form of a cage comprising longitudinal arms separated by longitudinal recesses. Such a spacer is relatively flexible in torsion.

In another embodiment, not shown, the flange 70 is rotationally affixed to the hub body 20. In this case, it is more difficult to minimize the prestressing or the clearance of the sensor 30 during assembly. If the prestressing is too substantial, e.g., greater than 1 Nm, the measurement and the offset will be inaccurate, particularly because of the hysteresis due to friction. If, conversely, the sensor 30 is mounted in the housing 48 with some clearance, then the small torques will go undetected, and there will be an error on the offset. However, in this embodiment, the prestressing can be adjusted by the spoking, by adjusting the balance between the tension of the driving spokes and that of the non-driving spokes.

Alternatively, the strain gauges 310 to 313 are connected in a half Wheatstone bridge configuration.

In another embodiment, not shown, the hub 2 is not equipped with the member 102 for measuring the angular velocity of the hub 2. In this case, the hub is not a power measurement system but only a torque measuring hub. However, with such a torque measuring hub, it is possible to obtain a measurement of the driving power of the wheel by determining its angular velocity through appropriate means that are positioned, for example, on another wheel of the cycle. In this case, it is conceivable to equip the cycle with a calculation module, for example incorporated into the onboard computer, for calculating the power from the measurement of the torque provided by the hub 2, and the measurement of the angular velocity.

In addition, the various embodiments and alternative embodiments described hereinabove can be combined with one another, partly or wholly, to give rise to other embodiments of the invention.

In addition to the foregoing, the invention disclosed herein by way of exemplary embodiments suitably may be practiced in the absence of any element or structure which is not specifically disclosed herein.

The invention claimed is:

1. A hub for measuring the driving torque of a cycle wheel, the hub comprising:
a central shaft defining an axis of rotation of the wheel;
a hub body mounted to rotate freely about the shaft;
a flange mounted to rotate freely about the hub body and axially aligned with the hub body;
a torque sensor including a test body which supports at least one strain gauge;
the torque sensor being housed in a two-part housing including a cutout arranged in an outer radial surface of the hub body, and a notch arranged in an outer radial surface of the flange.

2. A hub according to claim 1, wherein:
a longitudinal axis of the sensor forms an angle less than 45°, with a direction orthoradial to the axis of rotation of the hub, which passes through the center of the sensor.

3. A hub according to claim 1, wherein:
a longitudinal axis of the sensor forms an angle less than 20°, with a direction orthoradial to the axis of rotation of the hub, which passes through the center of the sensor.

4. A hub according to claim 1, wherein:
the sensor is structured and arranged so that, when the cyclist pedals, the sensor is compressed between a support surface of the cutout of the hub body and a support surface of the notch of the flange opposite the support surface of the hub body.

5. A hub according to claim 4, wherein:
the support surfaces are concave;
the test body includes two opposite convex support surfaces in contact against the support surfaces.

6. A hub according to claim 1, wherein:
each of the at least one the strain gauge is attached on a single upper surface of the test body.

7. A hub according to claim 6, wherein:
the at least one strain gauge comprises four strain gauges;
the test body supports the four strain gauges mounted in a Wheatstone bridge configuration;
a thickness of test body, measured perpendicular to the upper surface, varies between a minimum thickness and a maximum thickness;
a first and a second of the four strain gauges are located in the area of a zone of the test body, the thickness of which is less than a thickness of zones of the test body in the area of which a third and fourth of the four strain gauges are located.

8. A hub according to claim 1, wherein:
the test body includes two notches located on both sides of a longitudinal median plane of the test body;
each notch has a shape defined by a half cylinder;
a complete base of each of the half cylinders is an oblong contour.

9. A hub according to claim 8, wherein:
each of the at least one the strain gauge is attached on a single upper surface of the test body;
each of the notches includes a lower portion opening out on a surface opposite the upper surface, on the one hand, and an upper portion located on the side of the upper surface, on the other hand;
the upper portion has dimensions greater than dimensions of the lower portion.

10. A hub according to claim 1, wherein:
the test body includes a rib centered on a longitudinal central plane of the test body.

11. A system for measuring the driving power of a cycle wheel, the system comprising:
a torque-measuring hub comprising:
a central shaft defining an axis of rotation of the wheel,
a hub body mounted to rotate freely about the shaft;
a flange mounted to rotate freely about the hub body and axially aligned with the hub body;
a torque sensor including a test body which supports at least one strain gauge;
the torque sensor being housed in a two-part housing including a cutout arranged in an outer radial surface of the hub body, and a notch arranged in an outer radial surface of the flange;
the hub being equipped with a member for measuring the angular velocity of the hub relative to the central shaft.

12. A system according to claim 11, further comprising:
an electronic device, connected to the torque sensor and to the measuring member, for calculating the power of the wheel from the information transmitted by the torque sensor and the measuring member.

13. A cycle wheel comprising:
a torque-measuring hub comprising:
   a central shaft defining an axis of rotation of the wheel, a hub body mounted to rotate freely about the shaft;
   a flange mounted to rotate freely about the hub body and axially aligned with the hub body;
   a torque sensor including a test body which supports at least one strain gauge;
   the torque sensor being housed in a two-part housing including a cutout arranged in an outer radial surface of the hub body, and a notch arranged in an outer radial surface of the flange;
a rim;
spokes connecting the hub to the rim.

14. A cycle wheel comprising:
system for measuring the driving power of a cycle wheel, the system comprising:
   a torque-measuring hub comprising:
      a central shaft defining an axis of rotation of the wheel, a hub body mounted to rotate freely about the shaft;
      a flange mounted to rotate freely about the hub body and axially aligned with the hub body;
      a torque sensor including a test body which supports at least one strain gauge;
      the torque sensor being housed in a two-part housing including a cutout arranged in an outer radial surface of the hub body, and a notch arranged in an outer radial surface of the flange;
   the hub being equipped with a member for measuring the angular velocity of the hub relative to the central shaft;
a rim;
spokes connecting the hub to the rim.

* * * * *